United States Patent [19]

Dumora

[11] Patent Number: 4,656,720

[45] Date of Patent: Apr. 14, 1987

[54] METHOD OF FIXING A MALLEABLE METAL SLEEVE ON A ROD OF COMPOSITE MATERIAL

[75] Inventor: Denis Dumora, Vichy, France

[73] Assignee: Ceraver, S.A., Paris, France

[21] Appl. No.: 817,755

[22] Filed: Jan. 6, 1986

Related U.S. Application Data

[63] Continuation of Ser. No. 579,560, Feb. 13, 1984, abandoned.

[30] Foreign Application Priority Data

Feb. 22, 1983 [FR] France ................................ 83 02853

[51] Int. Cl.$^4$ ........................ B21D 39/00; B23P 11/00

[52] U.S. Cl. .......................................... 29/520; 29/631

[58] Field of Search .......................... 29/517, 520, 631; 174/176, 177, 140 S; 403/274, 285; 24/122.6

[56] References Cited

U.S. PATENT DOCUMENTS 3,152,392 10/1964 Coppack et al. ....................... 29/517

3,192,622 7/1965 Bannerman ........................... 29/517

3,549,790 12/1970 Reed II ................................ 174/177

4,303,799 12/1981 Ishihara et al. ...................... 174/176

FOREIGN PATENT DOCUMENTS 495241 4/1930 Fed. Rep. of Germany .

1400003 10/1968 Fed. Rep. of Germany .

363464 9/1962 Switzerland .......................... 29/517

*Primary Examiner*—Charlie T. Moon

*Attorney, Agent, or Firm*—Kenyon & Kenyon

[57] ABSTRACT

The present invention provides a method of fixing a sleeve (3) of malleable metal on a rod (10) of composite material, said sleeve comprising a cylindrical internal housing (6) in which an end (11) of said rod (10) is received. A compression operation is performed causing the sleeve to be stretched in a continuous manner over annular zones of the sleeve substantially from the inlet of the sleeve and substantially up to the end of the rod in such a manner as to cold draw the metal of the sleeve around the rod without stretching the composite material beyond its elastic strain limit.

6 Claims, 5 Drawing Figures

METHOD OF FIXING A MALLEABLE METAL SLEEVE ON A ROD OF COMPOSITE MATERIAL

This application is a continuation of application Ser. No. 06/579,560, filed Feb. 13, 1984 now abandoned.

The present invention relates to a method of fixing a malleable metal sleeve on a rod of composite material. The sleeve may be made, for example, of steel or of an aluminum alloy or bronze, while the rod may be constituted by synthetic resin bonded glass fibers.

BACKGROUND OF THE INVENTION

When the sleeve is part of an end fitting on an electrical insulator which has the rod as its insulating component, it will be understood that fixing the sleeve on the rod is an extremely critical operation. If the sleeve is mechanically crimped, the compression must be sufficient to hold the sleeve on the rod, even when a large traction force is applied thereto; yet the compression must not be excessive to avoid damaging the fibers and causing cracking.

U.S. Pat. Nos. 3,152,392 and 3,192,622 and French Pat. Nos. 2 418 960 and 2 447 082 propose inserting the end of the rod into the cylindrical housing of a sleeve whose outside surface may either by cylindrical or else it may be slightly conical or biconical. Crimping is performed by a multi-part polygonal compression matrix for applying inwardly directed radial force on all outside points of the sleeve simultaneously. The desired aim is to multiply the number of matrix parts in order to ensure that the radial force is as uniform as possible.

This method has drawbacks since it causes the sleeve metal to flow perpendicularly to the compression forces in two opposite directions which are symmetrical about a median plane through the compressed zone. This gives rise to traction forces on the rod fibers in two opposite directions. Further, if the compression forces are not uniformly applied along all the generator lines of the sleeve, rod ovalization is observed with layers of fibers shearing apart.

The known method thus damages the fibers in a manner likely to considerably reduce the performance of the insulator in question.

Preferred implementations of the present invention avoid these drawbacks by means of a new method which provides a new type of rod-to-sleeve assembly.

SUMMARY OF THE INVENTION

The present invention provides a method of fixing a sleeve of malleable metal on a rod of composite material, the sleeve including a cylindrical internal housing having an inlet at one end and into which an end of the rod is inserted, wherein the method comprises applying a compression force to the sleeve at circumferentially spaced areas in such a manner that successive annular zones of the sleeve are progressively elongated in the longitudinal direction, starting with an annular zone in the vicinity of the inlet and continuing to an annular zone substantially level with the end of the rod inside the sleeve, the elongation of the sleeve causing the malleable metal thereof to be cold drawn around the rod, thereby also elongating the composite material of the rod, the compression force being arranged to avoid elongating the composite material beyond its elastic strain limit.

By way of example, the elastic limit E of glass fibers is about 3% while the deformation of the metal may cause the sleeve to be lengthened by 6% to 10%.

Unlike known methods, the method of the invention causes the sleeve to be progressively clamped onto the rod in such a way as to stretch the fibers in a single direction from the inlet.

Preferably, the compression force is variable depending on the annular zone under consideration.

The present invention also provides an electrical insulator obtained by implementing the above method. It comprises at least one end fitting having a sleeve in which the end of a rod is fixed.

In a variant embodiment, and for reasons which are explained below, the sleeve inlet is surrounded by a lip which is not clamped onto the rod.

BRIEF DESCRIPTION OF THE DRAWINGS

An embodiment of the invention is described by way of example with reference to the accompanying drawings, in which.

MORE DETAILED DESCRIPTION

Figure 1:
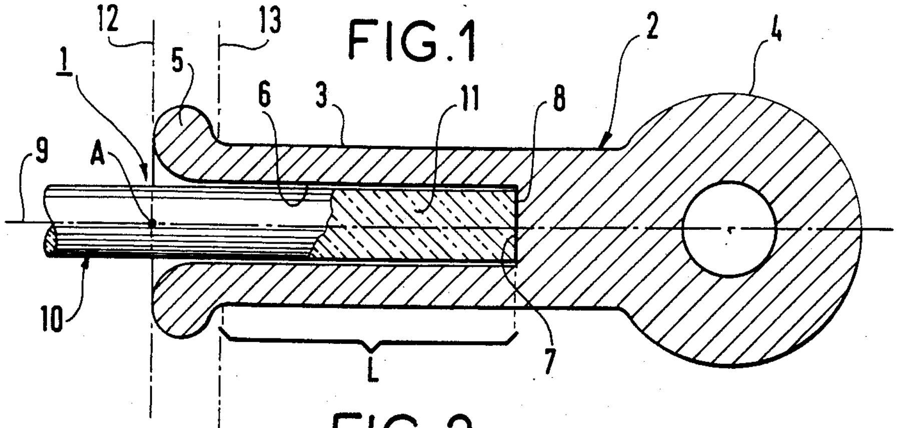
FIG. 1 is an axial section through the end of an organic insulator, and in particular through an end fitting which is fitted to the end of a rod of composite material.

FIG. 1 shows the end of an insulator 1 having an end fitting 2 made of malleable metal, such as steel or an alloy or bronze or aluminum, and comprising a cylindrical sleeve 3 and an end fastening 4 which may of any form suitable for insulator use. The essential point is that the end fitting 2 has a cylindrical sleeve 3 having an internal cylindrical housing 6 with an axis 9 and suitable for receiving as a push fit the end 11 of a rod 10 of composite material such as synthetic resin bonded glass fibers. (The play between the rod and the inside wall of the housing 6 has been deliberately exaggerated in the figure). The end face of the rod 10 is referenced 8 and is pressed against the end 7 of the housing 6.

The inlet to the end fitting 2 is surrounded by a lip 5 which is not compressed against the rod 10. The inlet plane of the end fitting which passes through the common axis 9 of the rod 10 and the end fitting 2 is referenced 12. Such an arrangement enables the zones of maximum mechanical stress which are situated in the compressed zone of the end fitting 2 to be separated from the zones of maximum electrical stress which are situated substantially outside the end fitting beyond the plane 12.

Figure 2:
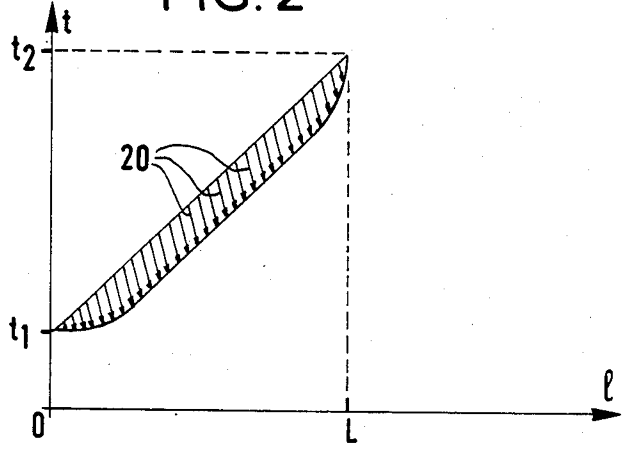
FIG. 2 is a graph showing very diagrammatically the amplitude of the compression forces applied to the sleeve.

The zone of the sleeve affected by the crimping is referenced L. It is delimited firstly by a plane 13 which is orthogonal to the axis 9 and which is situated behind the lip 5, and secondly by a plane orthogonal to the axis 9 and located approximately the end face 8 of the rod 10. FIG. 2 is a graph of the crimping operation in the plane of the FIG. 1 section, using two orthogonal axes ($\vec{Ot}$ and $\vec{O1}$) where $\vec{Ot}$ is a time axis and $\vec{O1}$ is a horizontal axis of points at which compression forces are applied to a generator line of length L. The lengths of the arrows 20 are representative of the amplitudes of the forces.

Unlike the prior art in which compression takes place simultaneously at all circumferentially spaced areas on the surface of the sleeve, pressure is applied progressively in accordance with the invention from $t_1$ to $t_2$ at different annular zones of the sleeve, starting substantially from the plane 13 and up to the vicinity of the plane of the face 8. The amplitude of the force applied is zero at the level of the plane 13 and then increases. It should be observed that the cross section of the rod 10 at point A remains fixed relative to the plane 12 throughout the crimping operation.

Figure 3:
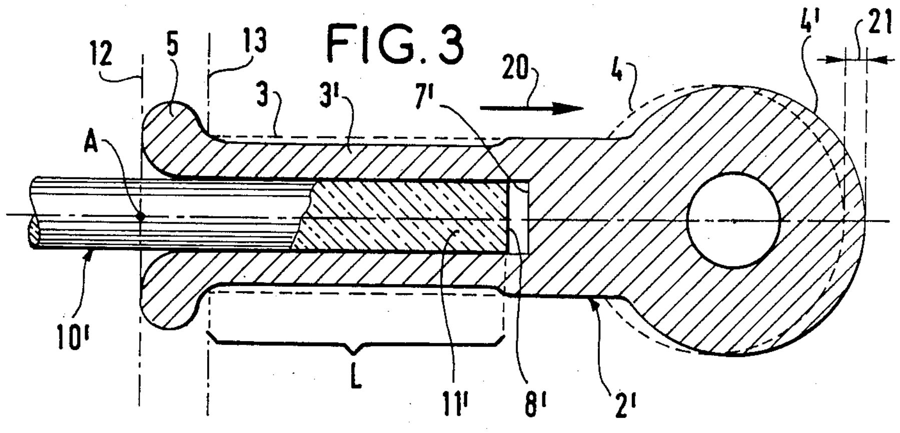
FIG. 3 is an axial section through the FIG. 1 insulator after the crimping operation outlined in FIG. 2.

In FIG. 3, the full lines show the end fitting 2' after crimping, while its initial outline is indicated by dashed lines. The sleeve and its fastening end are referenced 3' and 4' respectively. Under the effect of the crimping, the metal of the sleeve is cold drawn around the end 11' of the rod 10 in such a manner that the fibers of the rod are stretched only in the direction indicated by arrow 20. Since the fibers are elongated by less than their elastic strain limit, and since the sleeve has been elongated by 6% to 10% at the same time, a cavity has appeared between the faces 7' and 8' at the end of the housing in the sleeve 3'.

Figure 4:
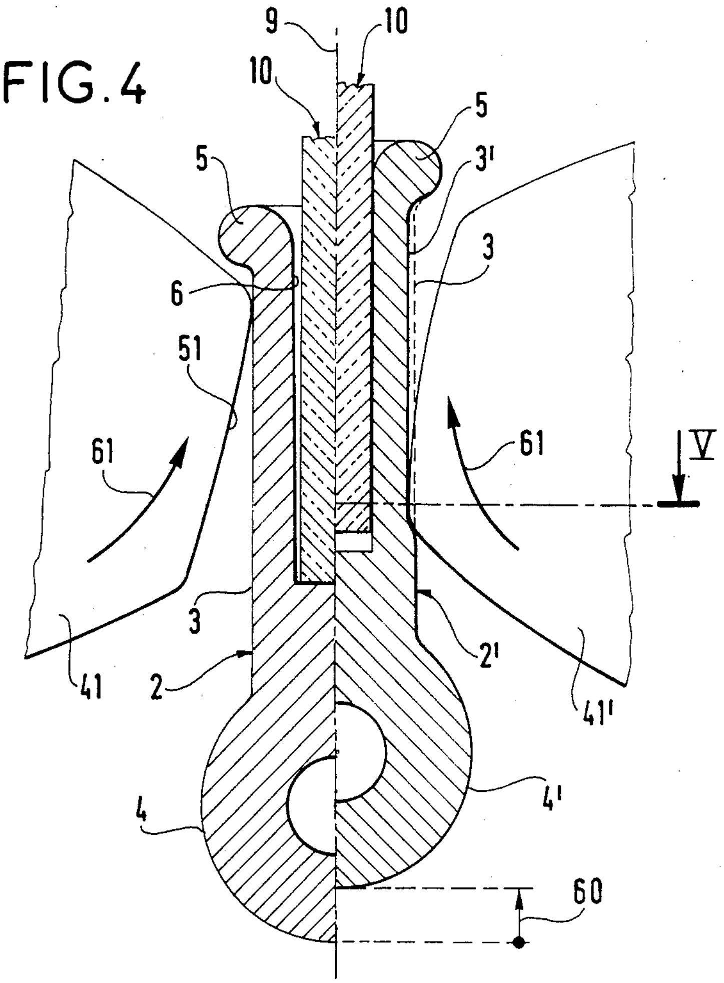
FIG. 4 is a diagrammatic section through a device for implementing the method of the invention, the left and right halves of this figure corresponding to the two states of the insulator shown in FIGS. 1 and 3 respectively.
Figure 5:
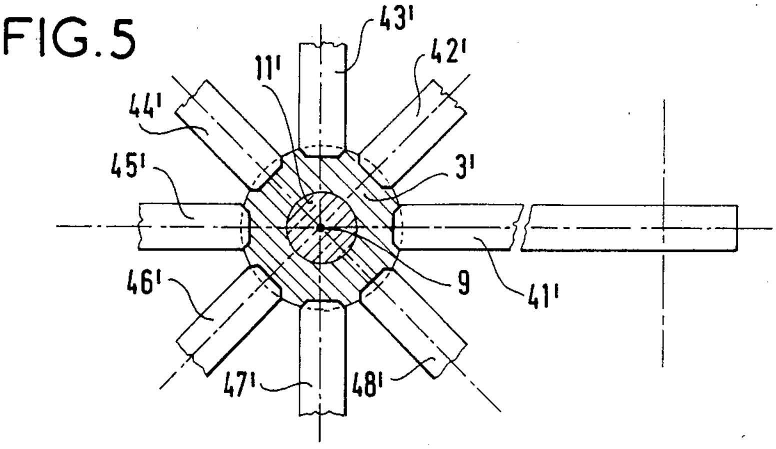
FIG. 5 is a diagrammatic cross section on a line V in FIG. 4; it shows in addition the set of compression sectors associated with the sleeve.

FIGS. 4 and 5 show very diagrammatically a device for implementing the method described above.

The lefthand side of FIG. 4 shows the device at its starting position (see FIG. 1), while the righthand side of the figure shows the device after a crimping operation has been performed (see FIG. 3).

The device includes eight curvilinear sectors 41 to 48. One of the sectors, namely the sector 41, can be seen in FIG. 4 both in its final position and in its initial position, while all of the sectors can be seen in FIG. 5 in the final position and referenced 41' to 48'. The sectors are disposed radially about the axis 9 of the rod 10 and they are uniformly distributed around the axis.

A portion 51 of the outside face of the sector 41 constitutes a compression zone for crimping. The arrangement is the same on all the other sectors. They are all rotated in their respective planes as indicated by arrows 61 for the sector 41. All the axes of rotation of the sectors lie in a plane which is orthogonal to the axis of the rod 10.

As the sectors rotate, the entire insulator is driven past them, as indicated by arrow 60, in such a manner that the compression zone of a sector is applied successively to all points along a zone of the sleeve having the same width as the sector.

As can be seen in FIG. 5, the transverse curvature of the sector compression zones is substantially nil. This arrangement simplifies sector manufacture, but it is not essential.

The number of sectors is naturally not limited to eight: it could vary, for example, as a function of the diameter of the sleeve to be crimped.

The longitudinal profile of the compression zone is chosen as a function of the force which it is desired to apply to such and such an annular zone of the sleeve.

As has already been emphasized, the method of the invention safeguards the fibers while ensuring the desired adherence of the rod in the sleeve. However the following advantage should also be noted in relation to an organic insulator comprising a rod of any required length, two end fittings crimped thereon, and an insulating coating which may include fins. It can be seen from FIGS. 1 and 3 that the distance between the inlet planes of the two end fittings is not modified by the method of the invention. It is thus possible to place the rod with its end fittings directly and without adjustment into a mold for casting a one-piece coating.

Naturally, the invention is not limited to the examples which have been described.

I claim:

1. A method for fixing an end fitting including a sleeve of malleable metal on a composite rod of nonmetallic insulating fibers bonded by synthetic resin, the sleeve having a cylindrical bore with an inlet end, wherein the method comprises:

inserting an end of the resin-bonded fiber rod into the inlet of the malleable metal sleeve;

compressing the sleeve radially against the rod at circumferentially spaced areas in annular zones moving in continuous progression from a first location adjacent to the inlet of the sleeve to a final location substantially even with the end of the rod while permitting the sleeve to expand freely in the axial direction toward said end of the rod so as to stretch the fibers of the rod without applying substantial radial compression thereto; and adjusting the radial compression force so as to cold flow the metal of the sleeve along and against the rod without stretching the composite material of the rod beyond its elastic strain limit.

2. A method according to claim 1 wherein the step of adjusting the compressing force comprises varying the compression force according to the axial location of the annular zone under consideration.

3. A method according to claim 2 wherein the step of varying the compression force comprises starting from zero compression at the first location, progressively increasing the force with axial distance from the first location to a maximum value, maintaining the maximum compression value for a major portion of the axial distance along the rod, and then progressively decreasing the force with increasing axial distance from the first location to substantially zero at the final location.

4. A method according to claim 1 further comprising providing the sleeve with an enlarged annular lip around the inlet end of the sleeve, the first location for applying the radial compression force being beyond the lip, while permitting the sleeve to expand freely in the axial direction downward the end of the rod so as to progressively stretch the fibers of the rod without substantial radial compression thereof.

5. A method according to claim 1 wherein the malleable metal of said sleeve is selected from the group consisting of steel, an aluminum alloy, and an aluminum bronze.

6. A method according to claim 1 wherein the nonmetallic fibers of the composite material of the rod comprise glass fibers.

* * * * *

UNITED STATES PATENT AND TRADEMARK OFFICE

CERTIFICATE OF CORRECTION

PATENT NO. : 4,656,720

DATED : 14 April 1987

INVENTOR(S) : Denis DUMORA

It is certified that error appears in the above-identified patent and that said Letters Patent is hereby corrected as shown below:

Col. 1, line 27: change "by" to --be--.
Col. 2, line 42: change "or" to --of--.
Col. 2, line 43: change "may of" to --may be of--.
Col. 2, line 67: after "approximately" insert --at--.
Col. 3, line 2: change "Ol" (where "l" is the number one) to --Ol-- (where "l" represents the small letter "l".
Col. 4, line 54: change "downward" to --toward--.

Signed and Sealed this

Eighth Day of December, 1987

*Attest:*

DONALD J. QUIGG

*Attesting Officer*

*Commissioner of Patents and Trademarks*